United States Patent [19]

Shutt

[11] 4,046,235

[45] Sept. 6, 1977

[54] AUTOMATIC LOAD BRAKE

[75] Inventor: Donald P. Shutt, Long Beach, Calif.

[73] Assignee: Western Gear Corporation, Lynwood, Calif.

[21] Appl. No.: 677,879

[22] Filed: Apr. 19, 1976

[51] Int. Cl.² .............................................. B60T 7/12
[52] U.S. Cl. .................................. 188/134; 192/8 R
[58] Field of Search .................. 188/134; 192/8 R, 16

[56] References Cited

U.S. PATENT DOCUMENTS

| | | | |
|---|---|---|---|
| 3,448,840 | 6/1969 | Rosin | 192/8 R |
| 3,493,087 | 2/1970 | Freeman et al. | 192/16 |
| 3,797,614 | 3/1974 | McCay | 188/134 |

*Primary Examiner*—Duane A. Reger
*Attorney, Agent, or Firm*—Forrest J. Lilly

[57] ABSTRACT

The disclosure is of an improvement of automatic load brakes, of the type generally and generically known as a Weston disk brake, as used, for example, in braking a hoisting drum adapted for reeling in and reeling out a cable suspending a load.

The frictional brake disks and plates, while lowering the load, experience a feed-back torque from the load. Means are provided for feeding only a proportional part of the total energy so fed back to only a fraction of the brake plates, whereby to instantly break these loose for relative rotation in response to lowering inputs. By this feature, response is instantaneous, and no further provisions are required to break away or accelerate the plates. Improvements are also disclosed by which, when feed-back is controlling the application of the brake, the usual oscillatory application of the brake, i.e., chatter, is stabilized and virtually eliminated. Another feature is continuous oil cooling of the brake disks and rings during the duty cycle of the brake (reeling out) and also during the off-duty cycle of the brake (reeling in), thus lowering the average temperature of the cooling oil. This is accomplished by an integral gear pump which pumps cooling oil continuously, and automatically reverses position to accomplish this as the direction of cable travel reverses.

23 Claims, 17 Drawing Figures

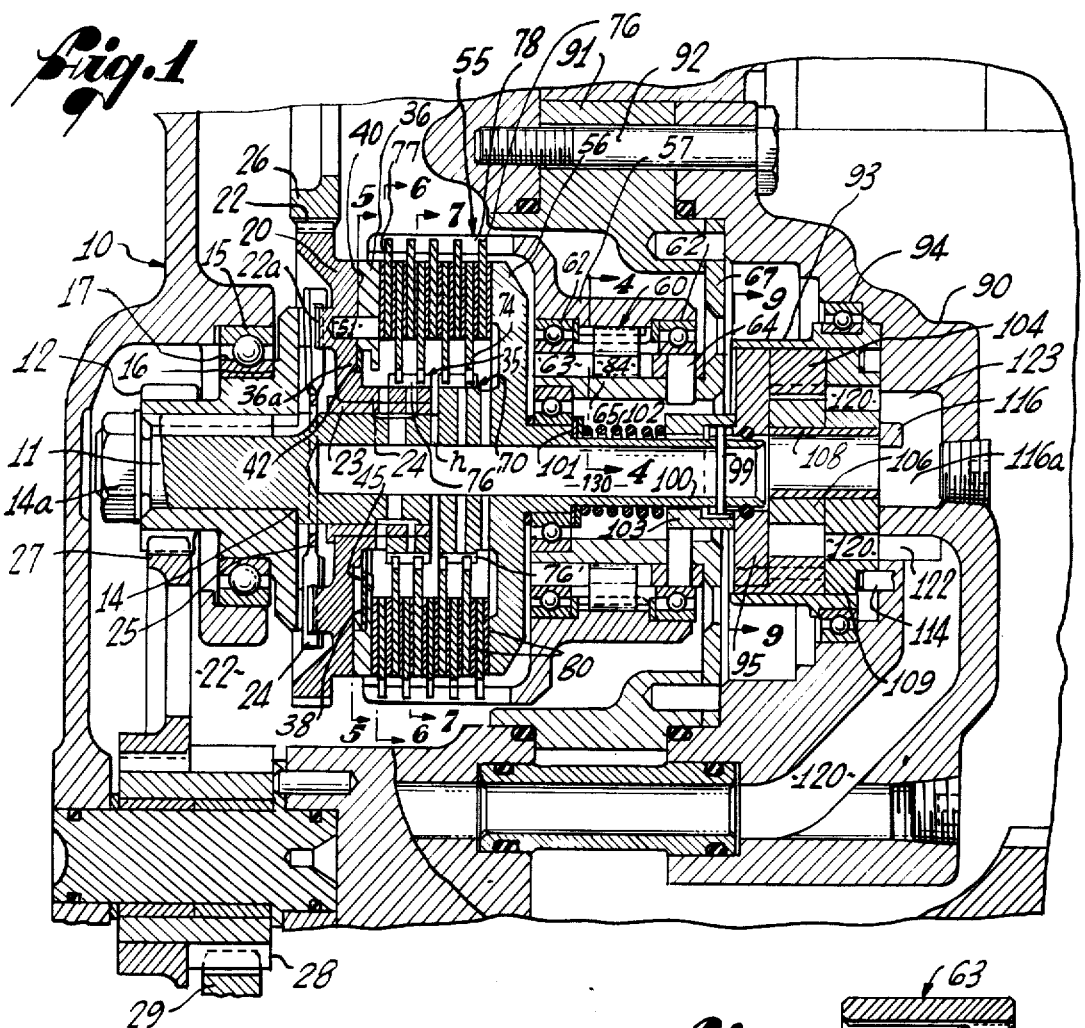

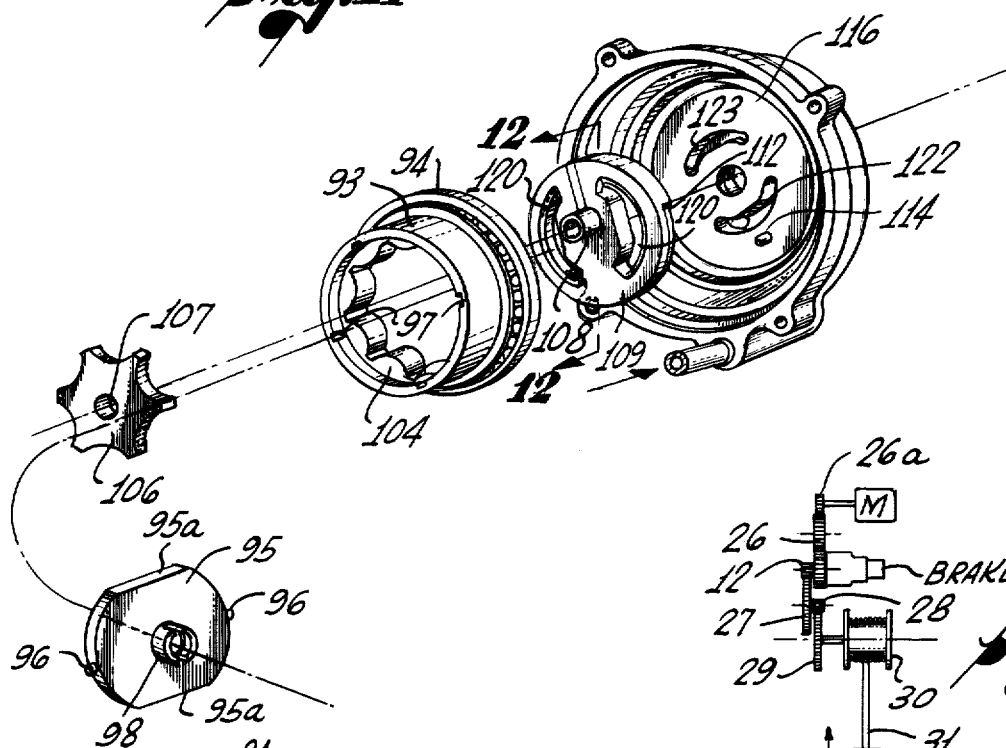

AUTOMATIC LOAD BRAKE

FIELD OF THE INVENTION

This invention relates generally to automatic load brakes, and is in the field of improvement in the broad class of multiple-disk load brakes sometimes known generically as Weston brakes, having the characteristics of automatic brake application in response to load.

BACKGROUND OF THE INVENTION

The so-called Weston load brake is a type well known for many years, and has been used in many industrial applications, such as heavy cranes, cable drum hoists, and others. Such brakes have been improved in many ways over many years time duration since their first inception. Ideal stability, chatter-free, and non-jamming performance, however, owing to various obscure and inadequately solved basic problems, has remained, despite scrutiny and extensive analytic study, an unattained goal in the art to the time of the present invention.

in the past, among improvements made in the original Weston type brakes, arrangements have been provided for feed-back of torque to the multiple disk brake responsively to output torque on the cable drum owing to load. Efforts have been made to use this feed-back to apply the brake to an extent equal to this feed-back. As mentioned in the preceding paragraph, however, the inherent problems in such a braking system have not been adequately solved, chattering operation still prevails, and basic objects of the invention are to find and understand these problems, and to provide practical solutions for them. The features had accomplishments of the present invention can best be understood and evaluated in the course of a detailed description of an illustrative embodiment of the invention, wherein the improvements accomplished by the invention are described or will appear.

For purpose of illustration, but without limitation, the invention will be described and illustrated in an adaptation to or combination with automatic braking of the cable drum of a drum and cable hoisting rig, carried for example by a helicopter.

BRIEF DESCRIPTION OF THE DRAWINGS

FIG. 1 is a longitudinal sectional view through a present illustrative embodiment of the brake of the invention;

FIGS. 2 and 3 are diagrammatic developed views looking towards the circular edges of a circular output pinion gear flange and an input gear web, showing the interaction of certain saw teeth, the view being developed into a flat plane;

FIG. 4 is a fragmentary transverse section taken on line 4—4 of FIG. 1;

FIG. 11 is an exploded view of a gear pump used in the invention;

FIG. 12 is a section taken on line 12—12 in FIG. 11;

FIG. 13 is a diagrammatic view showing an application of the load brake of the invention to and in combination with a hoisting drum;

FIG. 14 is a view of the flange of an output gear showing an array of saw tooth cams formed thereon, and looking in the direction of said flange from the right in FIG. 1;

FIG. 15 is a view looking in the opposite direction in FIG. 1 towards an input gear formed with a like array of saw tooth cams thereon adapted to engage with those on the flange of FIG. 14, and showing fragmentarily a roller cage and anti-friction rollers intervening between the ramps of the saw tooth cams on the web of the input gear and on the flange of the output gear; and FIG. 16 is a fragmentary view showing a portion of a sprag clutch lock sleeve, taken as indicated by the line 16—16 of FIG. 4, FIG. 17 is an enlarged view of a portion of the input gear of FIG. 15.

Figure 6:
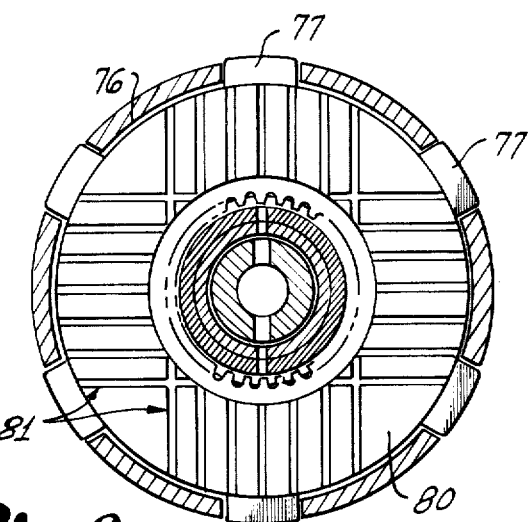
FIG. 6 is a transverse section taken on line 6—6 of FIG. 1.

With reference first to FIG. 1, a partially illustrated casing is designated at 10, and contained and journalled therein is a brake shaft 11, onto one end of which is fixed an output pinion 12, which may be termed broadly an output drive rotor. This rotor, in this instance a spur pinion, is keyed to the shaft 11, as shown, and is positioned axially thereon between a shaft shoulder 14 and a nut 14a. The pinion 12 has an outwardly facing circular bearing seat 17 engaged by bearing 15 set into a wall of casing 10. Beyond bearing 15 and seat 17, pinion 12 has a circular flange 16, furnished with a shoulder engaged by the inner race of bearing 15, and on the face of which is formed a circular array of successive saw teeth or ramps 18. The latter are preferably of a substantial angle, in the present design, substantially 24° relative to a transverse plane. The ramp angle of these teeth is critical in relation to other design features, in order to achieve a smoothly stabilized performance, as will be further described hereinafter. The teeth or ramps 18 also preferably merge at the top in heels 24a which are at substantially right angles to the plane of the pinion flange 16. In the present design, there are 12 of the teeth or ramps 18. Opposed to and adapted to interface or interfit with these teeth or ramps 18 is a similar circular array of similar teeth or ramps 19, also 12 in number, formed on the front side of the web 20 of an input gear or rotor 22. See FIGS. 14 and 15, looking in opposite directions toward these arrays of interengaging ramp teeth.

Small cylindrical antifriction rollers 22a are supported between the ramps 18 and 19, in radial positions relative to the brake shaft, being staked in radial slots in twisted blades 23 of a roller cage 24, the latter having a mounting ring 25 surrounding the brake shaft 11 between the pinion flange 16 and the web 20 of input gear 22.

The rollers 22a are slightly greater in diameter than the thickness of the blades 23 (FIG. 2) and the angles of the blades are the same as the angles of the ramps on the flange 16 and the input gear web. It will be noted that the blade mounting ring 25 is oversize relative to the brake shaft 11 running through it. The bladed roller cage has a self-centering action between the ramps 18 and 19.

The input gear 22, which is mounted on a bushing 23 limitedly axially slidable on the brake shaft 11, has spur gear teeth which are meshed (FIGS. 1 and 13) by a spur gear 26, which in turn meshes with a spur pinion 26a on the shaft of drive motor M. Also, in the present application, the spur pinion 12 meshes with a larger spur gear 27, formed with a pinion 28 which meshes with and drives a larger spur gear 29 driving the shaft of cable drum 30. It will be seen that there is a substantial step-down drive ratio from the shaft of motor M to the input gear 22, and a substantial step-down drive ratio fron the output pinion 12 to the cable drum 30. The drum 30 is shown with a wrapping of cable 31 whose free end supports a load L.

Returning now to a consideration of the input gear 22, it has a hub 34 in which the aforementioned bushing 23 is tightly mounted, and which includes and terminates in a radially enlarged, longitudinally splined head 35, generally resembling a spur gear. A pressure plate 36, in the form of a flat disk, with a central circular aperture 37, and with a counterbore 38, interrupted by three pads 39, is engageable against the opposed flat face 40 of the web of gear 22.

Figure 5:
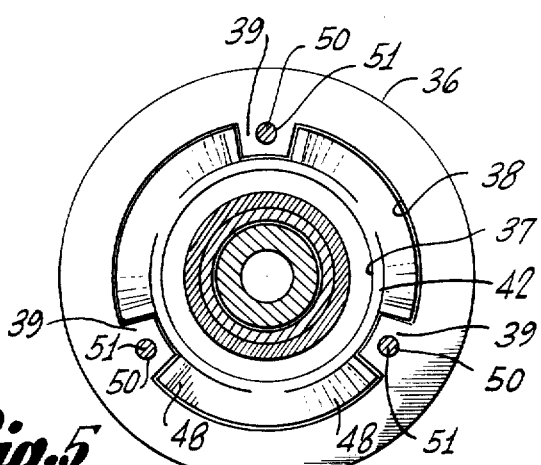
FIG. 5 is a transverse section taken on line 5—5 of FIG. 1.
Figure 8:
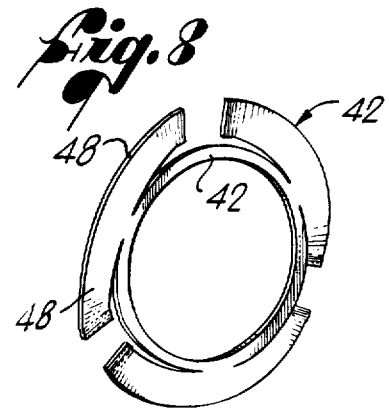
FIG. 8 is a perspective view of a circular finger spring, looking at said spring as though viewed from the left in FIG. 1.
Figure 9:
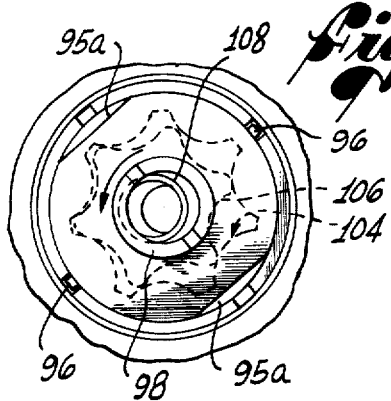
FIGS. 9 and 10 are transverse sections taken on line 9—9 and showing alternate positions and directions of rotation in opposite directions of rotation of the parts.
Figure 10:
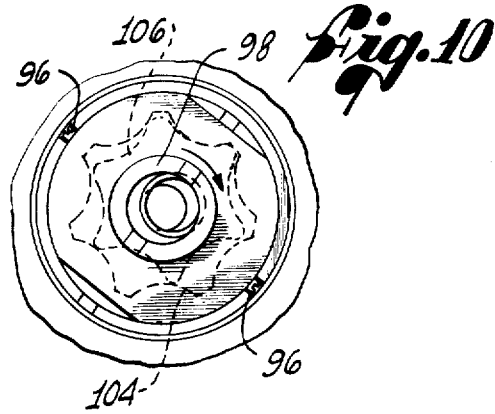

A light bias spring 42 acts between the web 20 of gear 22 and the pressure plate 36 to furnish a small normal compressive bias on the later described brake plates and disks. This spring (see FIGS. 1, 5 and 8) includes a central ring portion 44, freely receivable on or around a hub portion or externally facing coaxial shoulder 45 on the web 20 of gear 22. For clarification, this spring as seen in FIG. 8 is being viewed as though seen from the left in FIG. 1. The ring portion 44 of spring 42 bears on the back surface of gear web 20, outside of the shoulder 45.

Pressure plate 36 has apertures 50 (preferably three, spaced by 120°), adapted to engage and slide on three corresponding pins 51 projecting from the web of gear 22 in parallelism with the axis of the brake shaft, so the pressure plate can close against the web 20. Connected at three 120° spaced points to the external periphery of spring ring 44 are, at each such point, oppositely extending arcuate or circumferential spring arms 48, reaching forwardly to engage and exert bias pressure against the countersunk face 36a of the pressure plate.

A cylindric cup 55 of a presently described over-running clutch 60 projects from the right in FIG. 1 to just partially overlap, and surround with clearance, the circular pressure plate 36. This cup surrounds also a pack of brake plates and friction disks of the multiple disk brake, as well as a radial flange 56 integral with brake shaft 11. The latter presents a plane reaction face for the presently described brake plates and friction disks. Beyond flange 56 the cup has a reduction in diameter, and continues as a cylindric housing or barrel 57 for one-way or over-running clutch 60. This clutch is preferably of the known sprag type, and need not be described in great detail, particularly since other one-way clutches may be used. The barrel 57 is mounted on bearings 62, which are in turn supported on a sprag clutch lock sleeve 63, longitudinally slotted from its front end, as at 63a (FIG. 16). Sleeve 63 is pinned at 64 onto a tubular sprag clutch reaction shaft 65, and input shaft 11 is mounted by bearing 66 and supported by shaft 65. At its right hand end, the shaft 65 has a radial flange 67, whose periphery is fixed to the external casing 10, as illustrated. The brake shaft 11 is thus furnished with bearing by the bearing 66, which in turn is supported through shaft 65 and flange 67 from the external casing.

The brake shaft flange 56 bears a longitudinally splined hub or head 70, identical to and coaxial with the splined hub or head 35 on input gear 22, and the two heads 35 and 70 confront one another end-to-end, with an axial spacing therebetween as indicated.

Figure 7:
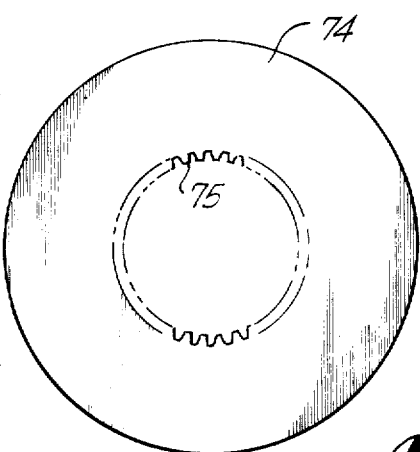
FIG. 7 is an elevational view of a brake plate.

Two brake plates 74 (FIGS. 1 and 7), centrally circularly apertured and formed around these apertures with spline teeth 75, mesh with the splines 76' of splined head 35. Intervening between these two brake plates 74, and between the first of these plates 74 (counting from the left in FIG. 1) and pressure plate 36, are friction disks 76, formed with six circumferentially spaced tangs 77 received in six longitudinal slots 78 formed in the overrunning clutch cup 55. The inner diameter of these friction disks 76 is somewhat larger than the outside diameter of the splined heads 35 and 70. Two more of the brake plates 74 have their splines in mesh with the splines 76' of the splined hub or head 70 on brake shaft flange 56. The splining of these coacting members is identical. Additional friction disks 76 intervene in the spaces between brake plates 74 on head 35, and in the spaces around head 70, and one is located between the first brake plate 74 and the face of pressure plate 76, while another is located between the last plate 74 and the opposed face of shaft flange 56. These are all normally under a light compression against input shaft flange 56 under pressure of the aforementioned bias spring 42.

The outer friction disks 76 include, on both their faces, e.g., bonded thereon, coating layers 80 of frictional non-metallic material, commercially known and available in the art, having the characteristic of little or no loss of friction at high temperatures (combatting brake fade). It preferably has the further characteristic of minute interstices capable of receiving coolant oil therein. This material is formed with a pattern of surface oil grooves or slots 81 which allows cooling oil to flow, under continuous pumping pressure, from the center outward, as described more fully hereinafter, supplying a thin oil shear film on the faces of the brake disks and rings during brake application, so that temperature is limited and warping or burning does not occur. Braking energy is absorbed by the shearing and heating of these thin films.

When brake application force is reduced, and the brake plates and disks loosen, the oil (under continued pressure) between the brake plates and friction disks works in between the plates and disks. Thus, acting through the pressure plate 36, the expanding plates and disks move the input gear 22 towards output gear flange 16, (from the position of FIG. 2 toward that of FIG. 3) over the light opposition of the bias spring 42. This is one novel feature of the invention and will be more fully described hereinafter. Absence of wear on the brake plates and disks is another feature of the invention, owing to use of the thin shear film at all times of relative movement of the plates and friction disks.

As mentioned earlier, the one-way clutch 60 is preferably and here indicated as of the sprag type, and the aforementioned sprag lock sleeve 63 and sprags 84 with a suitable sprag spring element 85 are indicated in the drawings. Such devices are well known in the art, and are on the market, and need not be fully described herein, and since, also, other suitable and known over-running or one-way clutches may be substituted by those skilled in the art, such as cam and roller clutches, or pawl and ratchet clutches. It will be understood that the orientation of the sprags of sprag clutch 60 is such that the clutch cup 55 and its barrel 57 rotate (over-run) in the counterclockwise direction when the brake shaft rotates counterclockwise (as viewed in FIG. 4), but will be coupled stationarily to the brake casing when the brake shaft is rotated in the opposite direction.

OPERATION OF BRAKING SYSTEM

The performance during raising of a load, in the illustrative hoisting operation depicted diagrammatically in FIG. 13, will first be described. The energy necessary to raise the load is transmitted directly from the drive motor M to the hoisting drum cable connected to the load L. The sprag clutch 60 allows the brake plate and friction disk pack to spin freely while the input gear 22 is turned in a direction to operate through pinion 12, and the earlier described step-down gear train leading to the cable drum of the hoist. Under these conditions, the brake disks and friction rings simply over-run, producing no heat. It should be noted that in the course of this operation, i.e., lifting of the load, the input gear 22 tends to move a little ahead of the output pinion 12, with a resulting camming action between the ramps 18 and 19, forcing the input gear 22 toward the right, and the plate and disk pack together. The brake is therefore "set", ready to hold when "raising" rotation and over-running of the sprag clutch is terminated. When, subsequently, lowering (as described here, a light load) is first initiated, the set brake is released. As will be more fully described hereinafter, the brake plates and friction disks, no longer under substantial compressive pressure, loosen a trifle, and are then separated by cooling oil which, under continuous pumping pressure, moves in between them (changing from a thin to a thick intervening oil film). The thin film will be of a thickness of the order of 0.0002 inch, with full dynamic braking action (short of lock-up).

The pressure of this coolant oil under these conditions, i.e., change from thin to thick film, moves the friction disks and brake plates toward the left, and, overcoming the bias spring 42, at least partially, moves the ramps 18 and 19 on the input and output gears towards and in relative rotation with respect to one another, such that the ramps move down one another, while the input gear 22 moves axially to the left. Thus they move from the diagrammatically represented distance X in FIG. 2 toward the distance Y in FIG. 3.

During lowering of the load, brake plate rotation is frictionally resisted by the friction disks. The brake is self-energized by a feed-back torque from the cable drum, geared to the output pinion 12 of the brake. A characteristic of the brake is that the torque reaction of the brake is proportional to the torque (load) fed back from the hoisting drum drive gear. Thus the brake only provides the necessary torque to react the load, and just enough more to provide deceleration. Therefore, brake heat and the problem of dissipating it have been minimized. The hoist drum drive gear should be noted as gear connected to the brake output pinion 12. It should also be borne in mind that the spring 42 functions at all times to force or bias the brake and friction disks together, toward the right in FIG. 1, so as to maintain normally at least a small friction torque loading.

Assume now, as a first condition of automatic brake application, that the input gear is either slowed down or stopped with respect to output pinion 12 (by slow-down or stopping of drive motor M). This applies the brake, as follows:

Pressure plate 36 is urged to the right by finger spring 42, lightly forcing the brake plates 74 and rings 76 together. The two brake plates 74 which are splined to the splined head 35 of the input gear 22, taken together with the face of the pressure plate 36, are in frictional contact with a total of five surfaces of friction disks 76. The other two brake plates 74, which are meshed with the splined head 70 of the brake shaft flange 56, taken together with the face of the radial flange 56, are in contact with the other five surfaces (total of ten) of friction disks 76. The first five surfaces related to input gear 12 apply a small braking torque due to pressure plate 36 and bias spring 42 which retards input gear 22 with its set of saw tooth cam elements 19 with respect to output pinion 12 with its set of saw tooth cam elements 18.

Now, as the input gear 22 is retarded, by slowdown or stopping of the input motor, the output gear 12 tends to over-run the input gear 22, which allows the cam teeth to move up their ramps using rollers 22a and roller cage 22b to afford anti-friction bearing. This action moves input gear 22 to the right (FIG. 2), compressing spring 42 until pressure plate 36 in effect bottoms out against the web of input gear 22. Continued travel of input gear 22 to the right compresses the brake plate and friction disk stack, applying braking torque through sprag cup 55, and the sprags of clutch 60 to stationary tubular sprag shaft 65 and brake casing 10. The feed-back torque reaction from the load to output pinion 12 causes this braking action with the braking torque proportional to the feed-back torque at the pinion 12. This braking reaction also takes place while the brake pinion 12 and input gear 22 are rotated under power of motor M to lower a load. The input gear 22 is rotated in the direction to lower the load, allowing, for example, the rollers 22a to roll down the ramp teeth a minute amount, in the direction from the position of FIG. 2 toward that of FIG. 3, which permits input gear 22 and pressure plate 36 to move to the left a minute amount, under pressure of the bias spring 42, aided somewhat by the thickening oil film therebetween, and then vice versa, so there is a slight periodic slippage between friction disks 76 and brake plates 74. If the slippage is too great, the output pinion 12 accelerates ahead of input gear 22 causing the rollers 22a to roll up the ramps which again applies the brake, expressing pressure oil from between the brake disks and rings. By proper design, as taught by the present invention, the action of relieving or applying brake force stabilizes at the value proportional to the feed-back torque from the hoist drum and load and the brake can thus be called an "automatic load brake". The brake is a mechanical servo system. Overall torque balance of the system is inherently achieved when the sum of the feed-back torque from the load, plus the input torque required to overcome the brake decelerating torque equals the total braking torque. When the input torque from motor M is removed, the brake torque will decelerate the load to a stop and will hold the load there.

To accomplish stabilization, and avoid substantial oscillation or "brake chatter" (which has not been simply or adequately solved in the past), I take the simple but heretofore inobvious step of making the ramp angle steep enough (24° in this case) to attain a critically large axial displacement of the input gear and pressure plate for a very small angular rotation of the input gear cam relative to the output pinion cam. This causes a smooth and continuous modulation to take place with only small or minute angular rotation of the input gear cam to output pinion cam. Because of the minuteness of amplitude of this angular modulation, the inertia effect of the input and output members is made virtually uncritical, thus attaining a virtually instantaneous response of the mechanism, and eliminating torsional oscillation or brake chatter as a factor to all practical intents and purposes. To my knowledge, there is thus attained an ideal, smooth performance, not heretofore experienced.

An important feature of the invention is that during raising of the load, the brake disk stack is locked up and the entire brake disk assembly tumbles by overrunning the one-way sprag clutch 60. Thus the brake allows almost all of the input torque to be utilized to lift the load.

A primary feature of my automatic brake design is the separation of a quantity of surfaces of the brake plates 74; some splined to the aligned hub of the input gear 22, and some to the splined head 70 on the brake shaft flange 56. In the present illustrative configuration, these quantities are two and two for each member. It should be noted however that the quantities related to the input gear 22 could be more or less than that for the brake shaft 11, and the cam angle would then be adjusted accordingly to produce the self-energizing requirement of the mechanical servo loop. The advantage of this splitting up of the quantities of disks related to each member, i.e., the splined head on the input gear and the splined head on the brake shaft flange 56, (in this case a 50—50 split) is that the input torque required to break away or start the brake disks slipping is only a fraction of the torque required to lift the suspended load. Therefore, the brake is of an inherently non-jamming character, and this is one of the primary features of the invention. When holding or lowering a load, the load brake experiences a feed-back torque from the load. This feed-back torque is divided (as 50—50) so that a substantial proportionate part of the total torque so fed back is transmitted to the casing, reserving, however, an adequate remaining portion to be related to the input gear to instantly break loose the brake input for relative rotation in response to lowering commands. By this feature, brake lock-up is inhibited, response is instantaneous, and no further provisions are required to breakaway or accelerate the braking surfaces.

It will be noted that the friction between cams is insignificant, because of the anti-friction rollers. The cam angles are then made large, with the result of large axial displacement of the input gear and pressure plate for very small angular displacement of the input gear, and axial force application thus closely follows minute changes in feed-back torque.

OIL COOLING AND BRAKE DISK SEPARATION SYSTEM OF THE INVENTION

The brake of the invention has a unique oil cooling system, involving a commercial gear pump of a type manufactured by Tuthill Pump Co., Chicago, Ill. This specific pump is not, per se, a part of the present invention, but is well adapted to play the part of a component in the carrying out of the invention. The system of the invention causes pumping of cooling from a reservoir of oil contained within the casing, and pumps cooling oil during both directions of rotation of the brake shaft, i.e., during both reeling out, while the brake disk elements are moving in active frictional contact, and heat is being generated, and during reeling in, while there is no such relative movement of the brake disk elements, and no heat is being generated. Accordingly, by pumping cooling oil during both the duty and off-duty cycles of the brake, the heat extracted by the cooling oil over a given working period (reeling out and reeling in) is substantially increased, and the brake may be at a substantially lower temperature. I have found that prior troubles from overheating, and resulting burning and warpage of brake plates and friction disks, are totally combatted by this system.

Referring now to FIGS. 1, 9, 10, 11 and 12, the back cap 90 of casing 10 is fitted to the intermediate casing component member 91 by screws such as 92.

A cylindrical gear pump casing 93, concentric with the brake shaft, is supported for rotation inside casing cap 90 by a bearing 94 set into cap 90. The front end of casing 93 receives a pressure plate 95, furnished with pins 96 adapted to engage in open-ended slots 97 sunk in the inner periphery of the cylindrical pump casing 93. The front side of pressure plate 95 has a central tubular slotted hub 98, adapted to engage projecting end portions of a coupling pin 99 extending transversely through the rearward reduced end portion 100 of the brake shaft 11. A coil spring 102 seats at its left hand end (FIG. 1) against rearwardly facing shaft shoulder 101 and washers, and bears as its rearward end against a slide collar 103, slidable on shaft portion 100, and apertured to clear the projecting ends of coupling pin 99. Collar 103 bears against pump pressure plate 95, under the pressure of spring 102. It can be retracted to uncover the ends of the transverse pin 99.

Tightly mounted inside cylindrical barrel 93 is the outer peripheral scalloped member 104 of the gear pump, and mounted eccentrically inside member 104, is the coacting "star"-shaped rotor element 106. Member 106 has a central bore 107 therethrough, and an eccentric sleeve 108 of a pump disk 109 penetrates this bore 107.

The back of pump disk 109 has, at substantially 180° spacing, a pair of opposed stop shoulders 112, which are adapted to alternately engage a stop pin 114 set into a transverse wall 116 spaced shortly forward of the back wall of the casing cap 90, depending upon the direction of brake shaft rotation (reeling out, or reeling in). The location of this stop pin 114 is correctly shown in FIG. 11, it is actually in front of the plane of the paper in FIG. 1.

Disk 109 has two generally arc-shaped, circumferentially directed slots 120, and the wall 116 of cap 90 somewhat similarly has two arc-shaped, circumferentially directed slots 122 and 123.

Coolant oil is filled into the casing, and is conveyed via a passage 120 in the casing, port 122, thence into one of the arc-shaped slots 120 in disk 109, and into the space between the scallops of member 104 and rotor teeth 106a of the pump on one side of the latter. Depending upon the direction of brake shaft rotation, the disk 109 will turn through a half-turn until one of its shoulders 112 engages the stop pin 114 and stops rotation of disk 109. Rotation of barrel 93 by shaft 11 then occurs, and the scalloped pump member 104 meshing with star gear 106 eccentrically mounted on now arrested disk 109 rolls around the inside of the scalloped member. Oil at this time is taken into the pump by suction via the arcuate slot 122, enters between the scallops and star gear of the pump on one side, progresses a half-turn around the pump casing, exits on the opposite side of the pump through the other arcuate slot 120, passes in through the opposite slot 123 in the cap wall 116, then passes through the central hole 116a in wall 116, then through the eccentric sleeve 108, and on to enter into the bore 130 in brake shaft 11.

When the brake shaft 11 reverses direction, the disk 109 turns through substantially 180°, until its other or second stop shoulder 112 engages stop pin 114. Inflow of oil from passage 120 now enters via slot 122, as before, through the then aligned disk slot 120, and is conveyed by the scalloped and star shaped elements of the gear pump again around (but in the opposite direction) to the output side, to discharge again through slot 123, hole 116a, and the hollow brake shaft.

Coolant oil is thus continuously supplied to the bore in the brake shaft during rotation of said shaft in either direction. This oil is forced radially outward through oil passages in the shaft 11, including those illustrated as opening through, in back of, and between splined heads 35 and 70. This oil travels on outwardly via the aforementioned surface grooves in the friction layers on the faces of the friction rings 76. The latter discharge inside the casing, and this heated oil is added to that in the casing. Radiation from the casing is sufficient to hold temperatures under sufficient control to adequately cool the brake plates and friction disks.

This coolant oil has further functions and properties in the invention. When the brake is applied, the oil film between friction disks and rings as these parts approach very closely to one another, becomes very thin, and under these conditions, these thin oil films shear and so dissipate a large quantity of energy to the oil circulating generally radially outward under pump pressure via the relatively shallow grooves 81 in the faces of the friction layers on the friction disks 76. When the friction disks finally clamp tightly and lock under axial pressure of the pressure plate on the web of the input gear, even the thin film disappears, being at least partially absorbed or received into the porous structure of the friction disk coating layers. When this axial pressure is relieved, oil so squeezed into the coating layers returns to the surfaces, the friction plates and rings loosen slightly, and the coolant oil under pump pressure works in between the brake plates and friction disks to resupply the thin oil films, and immediately thickens these films, as well as developing an axial oil pressure leftward on the disks and brake plates. This moves the pressure plate 36 and input gear web leftward, as in the direction from the position of FIG. 2 towards that of FIG. 3.

The aforementioned coolant oil pump has a pressure relief device, employing opposed flats 95a on the pressure plate 95. When pressure builds up above the predetermined maximum in the pump outlet regions, this plate is moved to the left, against spring-urged collar 103, unseating it from the near face of the scalloped and star shaped pump elements, and enabling escape of oil around and past these flats 95a to escape to the interior of the casing.

The drawings and description are of course of one embodiment of the invention in one illustrative application, and the invention contemplates and includes such modifications and adaptations as fall within the range of equivalents of the invention.

What is claimed is:

1. An automatic load brake of the Weston class, using a drive motor, and adapted for coupling to a load imposed as a torque, comprising:
    an external casing,
    an axially restrained output drive rotor journalled for rotation on a fixed axis relative to said casing, and adapted for coupling to a load applied as a torque,
    an input drive rotor journalled for rotation in said casing about said fixed axis, said input rotor adapted for rotary drive by said motor, at least one of said rotors being adapted for axial travel along said fixed axis,
    said output drive rotor and said input drive rotor having interengaging circularly disposed ramp formations on opposed faces thereof which interact to move said input drive rotor axially away from said output drive rotor in relative rotation in one direction of said rotors, and which allow said input drive rotor to return axially toward said output drive rotor in relative rotation in the opposite direction of said rotors,
    opposed, longitudinally splined hubs on said rotors,
    a plurality of brake plates, at least one of said plates being splined on said hub of said output rotor and at least one of said plates being splined on said hub of said input rotor,
    means on the side of said input drive rotor, opposite from the side thereof having said ramps, providing a plane brake pressure surface facing toward said brake plates,
    means on said output drive rotor providing a plane brake reaction surface facing toward said plane brake pressure surface,
    friction brake disks intervening in spaces between, and engageable with, said brake plates, and intervening also between and engageable with the end brake plates and said brake pressure reaction surfaces,
    disk guide means engaging and coacting with guide formations on said friction disks for guiding them generally axially;
    a one-way rotary holding means for reacting between said disk guide means and said casing to permit rotation of said friction disks and brake plates, in the incoming direction of rotation of said rotors, and to lock said disk guide means and friction disks and plates against rotation relative to said casing in the outgoing direction of rotation of said rotors; and
    means for urging said rotors to return axially toward each other in response to said opposite rotation of said rotors.

2. The subject matter according to claim 1, wherein said means on said input drive rotor providing said plane brake pressure surface comprises a separate pressure plate mounted concentrically on said input rotor, on the side thereof opposite from the said ramp formation, and arranged for axial travel toward and from said input rotor, and a light bias compression spring seated between said input drive rotor and said pressure plate acting in compression against said pressure plate to serve as said means for urging said input drive rotor to return axially toward said output drive rotor, thereby maintaining contact between said plates and disks to provide immediate braking action.

3. The subject matter according to claim 2, including a cooling oil pump for pumping cooling oil under pressure unidirectionally toward the centers of said plates and into the space between said plates and disks to supply cooling oil which forms a thin shear film therebetween during brake application, and prior to lock-up between plates and disks, said plates and disks loosening and the spaces therebetween receiving oil under pressure during recession of brake application.

4. The subject matter of claim 3, wherein said friction disks have internal apertures from face to face therethrough,
- said pump having a pressurized outlet leading via an oil passage to the interior space provided by said internal apertures of said disks,
- the faces of said friction disks having grooves to convey oil from said interior space to the exterior of said casing around the perimeter of said friction disks.

5. The subject matter of claim 4, including means drivingly coupling at least one of rotors to said pump.

6. The subject matter of claim 4, wherein said output rotor is drivingly coupled to said pump.

7. The subject matter of claim 1, wherein said ramps comprise interengageable saw tooth cams on opposed faces of said output and input drive rotors, and including also,
- anti-friction rollers between the opposed ramp faces of said cams, and
- a cage for said rollers holding and positioning said rollers between and in engagement with said ramp faces.

8. The subject matter of claim 1, in which said disk guide means comprises a cup surrounding said brake plates and friction disks, formed with longitudinal slots, and
- tangs on the peripheries of the friction disks engageable in and moveable along said slots.

9. The subject matter of claim 1, wherein the angle of the ramps is steep enough to obtain a critically large axial displacement of the input gear and for a very small angular rotation of the input rotor ramp relative to the output rotor ramp, at which relative oscillation of output and input rotors closely approaches zero and brake chatter is eliminated.

10. The subject matter of claim 1, including a rotatable brake shaft on said axis, with said output rotor axially fixed thereon, and said input rotor mounted for axial movement therealong, and
- means connecting said brake shaft to said pump.

11. The subject matter of claim 1, including two of said brake plates splined on each of said hubs.

12. An automatic load brake of the Weston class, using a drive motor, and adapted for coupling to a load imposed as a torque, comprising:
- an external casing,
- an axially restrained output drive rotor journalled for rotation on a fixed axis relative to said casing, and adapted for coupling to a load applied as a torque,
- an input drive rotor journalled for rotation in said casing about said axis and adapted for axial travel therealong, said input rotor adapted for rotary drive by said motor,
- at least one of said rotors being adapted for axial travel along said fixed axis,
- said output rotor and said input drive rotor having circularly disposed ramp formations interengaging on opposed faces thereof which interact to move said input drive rotor axially away from said output drive rotor in relative rotation in one direction of said rotors, and which allow said input drive rotor to return axially toward said output drive rotor in relative rotation in the opposite direction of said rotors,
- opposed, longitudinally splined hubs on said rotors,
- a plurality of brake plates, at least one of said plates being splined on said hub of said output rotor and at least one of said plates being splined on said hub of said input rotor,
- means on the side of said input drive rotor opposite from the side thereof having said ramps, providing a plane brake pressure facing toward said brake plates,
- means on said output drive rotor providing a plane brake reaction surface facing said plane brake pressure surface,
- friction brake disks intervening in spaces between, and engageable with, said brake plates, and intervening also between and engageable with the end brake plates and said brake pressure and reaction surfaces,
- disk guide means for engaging and coacting with guide formations on said friction disks for guiding them generally axially,
- a one-way rotary holding means for reacting between said disk guide means and said casing to permit rotation of said friction disks and brake plates in the incoming direction of rotation of said rotors, and to lock said disk guide means and friction disks and plates against rotation relative to said casing in the outgoing direction of rotation of said rotor; and
- means for urging said input drive rotors to return axially toward each other in response to said opposite rotation of said rotors.

13. An automatic load brake of the Weston class, using a drive motor, and adapted for coupling to a load imposed as a torque, comprising:
- an external casing,
- an axially restrained output drive rotor journalled for rotation on a fixed axis relative to said casing, and adapted for coupling to a load applied as a torque,
- an input drive motor journalled for rotation in said casing about said fixed axis, said input rotor adapted for rotary drive by said motor, at least one of said rotors being adapted for axial travel along said fixed axis,
- means for moving said rotors apart axially in response to relative rotation in one direction, which allows said rotors to return axially toward each other in response to relative rotation in the opposite direction,
- a plurality of brake plates, at least one of said plates being attached to said output rotor for rotation therewith, and at least one of said plates being attached to said input rotor for rotation therewith,
- means on said rotors for applying brake pressure to said brake plates,
- friction brake disks intervening in spaces between, and engageable with, said brake plates,
- a one-way rotary holding means for reacting between said disk guide means and said casing to permit rotation of said friction disks and brake plates in the incoming direction of rotation of said rotors, and to lock said disk guide means and friction disks and plates against rotation relative to said casing in the outgoing direction of rotation of said rotors; and
- means for urging said rotors to return axially toward each other in response to said opposite rotation of said rotors.

14. The subject matter according to claim 13, further comprising:
- oil pump means for supplying oil to said disks and plates, and
- means for driving said pump means at a speed proportional to the speed of one of said rotors, thereby providing oil flow proportional to the heat generated by said disks and plates.

15. The subject matter according to claim 14, further comprising passage means for supplying oil from said pump means toward centers of said disks and plates, thereby allowing oil to flow radially outwardly.

16. A brake or clutch adapted for coupling to a load imposed as a torque, comprising:
an external casing,
an output rotor journalled for rotation on a fixed axis relative to said casing, and adapted for coupling to a load applied as a torque,
an input motor journalled for rotation in said casing about said fixed axis,
a plurality of brake plates, each attached to one of said rotors for rotation therewith,
means for applying braking pressure to said brake plates,
friction brake disks intervening in spaces between, and engageable with, said brake plates,
oil pump means for supplying oil to said disks and plates, and
passage means for supplying oil from said pump means towards the centers of said disks and plates, thereby allowing oil to flow radially outwardly, to provide a thin film of oil across the working surfaces thereof.

17. The subject matter according to claim 16, further comprising means for driving said pump means at a speed proportional to the speed of one of said rotors, thereby providing oil flow proportional to the heat generated by said disks and plates.

18. The subject matter according to claim 16, wherein said disks have grooves therein to carry oil radially outwardly along the friction surfaces thereof.

19. An automatic load brake of the Weston class, using a drive motor, and adapted for coupling to a load imposed as a torque, comprising:
an external casing,
an axially restrained output drive rotor journalled for rotation on a fixed axis relative to said casing, and adapted for coupling to a load applied as a torque,
an input drive rotor journalled for rotation in said casing about said fixed axis, said input rotor adapted for rotary drive by said motor, at least one of said rotors being adapted for axial travel along said fixed axis,
means for moving said rotors apart axially in response to relative rotation in one direction, which allows said rotors to return axially toward each other in response to relative rotation in the opposite direction,
a plurality of brake plates, each attached to one of said rotors for rotation therewith,
means on said input drive rotor for applying brake pressure to said brake plates,
friction brake disks intervening in spaces between, and engageable with, said brake plates,
a one-way rotary holding means for reacting between said plates and said casing to permit rotation of said plates relative to said casing in the incoming direction of rotation of said rotors, and for holding said plates against rotation relative to said casing in the outgoing direction,
means for urging said rotors to return axially toward each other in response to said opposite rotation of said rotors;
oil pump means for supplying oil to said disks and plates, and
passage means for supplying oil from said pump means towards the centers of said disks and plates, thereby allowing oil to flow radially outwardly, to provide a thin film of oil across the working surfaces of the plates.

20. The subject matter according to claim 19, further comprising means for driving said pump means at a speed proportional to the speed of one of said rotors, thereby providing oil flow proportional to the heat generated by said disks and plates.

21. The subject matter according to claim 19, wherein said disks have grooves therein to carry oil radially outwardly along the friction surfaces thereof.

22. An automatic load brake of the Weston class, using a drive motor, and adapted for coupling to a load imposed as a torque, comprising:
an external casing,
an axially restrained output drive rotor journalled for rotation on a fixed axis relative to said casing, and adapted for coupling to a load applied as a torque,
an input drive rotor journalled for rotation in said casing about said fixed axis, said input rotor adapted for rotary drive by said motor, at least one of said rotors being adapted for axial travel along said fixed axis,
means for moving said rotors apart axially in response to relative rotation in one direction, which allows said rotors to return axially toward each other in response to relative rotation in the opposite direction,
a plurality of brake plates, each attached to one of said rotors for rotation therewith,
means on said input drive rotor for applying brake pressure to said brake plates,
friction brake disks intervening in spaces between, and engageable with, said brake plates,
a one-way rotary holding means for reacting between said plates and said casing to permit rotation of said plates relative to said casing in the incoming direction of rotation of said rotors and for holding said plates against rotation relative to said casing in the outgoing direction of rotation of said rotors,
said holding means comprising a sprag clutch having an outer annular member, an inner annular member, a plurality of sprags disposed between said annular members to frictionally engage said outer member upon rotation in said outgoing direction, and sprag lock means for positively retaining said sprags against rotation relative to said inner annular member, and
means for urging said rotors to return axially toward each other in response to said opposite rotation of said rotors.

23. The subject matter of claim 7, wherein said roller cage comprises a mounting ring and a plurality of twisted blades depending from said ring, said rollers being staked in slots in said blades.

* * * * *